United States Patent

Menich et al.

Patent Number: 5,901,354
Date of Patent: May 4, 1999

[54] METHOD AND APPARATUS FOR PERFORMING SOFT-HANDOFF IN A WIRELESS COMMUNICATION SYSTEM

[75] Inventors: Barry J. Menich, Schaumburg; Keith A. TenBrook, Cary; Thomas W. Ritchie, Arlington Heights; Daniel J. DeClerck, Algonquin, all of Ill.

[73] Assignee: Motorola, Inc., Schaumburg, Ill.

[21] Appl. No.: 08/627,260

[22] Filed: Apr. 3, 1996

[51] Int. Cl.⁶ .................................................. H04Q 7/22
[52] U.S. Cl. .......................................................... 455/442
[58] Field of Search .................................. 455/436, 442, 455/437, 522

[56] References Cited

U.S. PATENT DOCUMENTS

| | | | |
|---|---|---|---|
| 5,475,861 | 12/1995 | Hall | 455/422 |
| 5,491,717 | 2/1996 | Hall | 455/436 |
| 5,542,111 | 7/1996 | Ivanov et al. | 455/522 |
| 5,548,808 | 8/1996 | Bruckert et al. | 455/442 |
| 5,574,983 | 11/1996 | Douzono et al. | 455/522 |
| 5,745,520 | 4/1998 | Love et al. | 370/242 |

Primary Examiner—Curtis A. Kuntz
Assistant Examiner—Myron K. Wyche
Attorney, Agent, or Firm—Richard A. Sonnentag

[57] ABSTRACT

Generally stated, a method for performing soft-handoff within a wireless communication system 100 is described herein. The wireless communication system 100 includes, inter alia, a mobile station 104, a first base station 102 in communication with said mobile station via a first communication resource 120, and a second base station 106 with a corresponding second communication resource 130. In a first preferred embodiment, a determination is made that the first communication resource 120 is no longer necessary. The wireless communication system 100 verifies that the second base station 106 has acquired the mobile station 104 via the second communication resource 130. If the second base station 106 has yet to acquire the mobile station 104 on the second communication resource 130, the wireless communication system 100 will override the normal power control mechanisms, increasing the mobile station's 104 transmit power, thereby mitigating the opportunity for an orphan condition to develop.

16 Claims, 3 Drawing Sheets

METHOD AND APPARATUS FOR PERFORMING SOFT-HANDOFF IN A WIRELESS COMMUNICATION SYSTEM

FIELD OF THE INVENTION

The present invention relates generally to wireless communication systems and, more particularly, to effecting a handoff within a wireless communication system.

BACKGROUND OF THE INVENTION

Wireless communication systems are well known and consist of many types including land mobile radio, cellular radiotelephone (inclusive of analog cellular, digital cellular, personal communication systems (PCS) and wideband digital cellular systems), and other communication system types. In cellular radiotelephone communication systems, for example, a number of communication cells are typically comprised of base stations (BS's), generally linked to one or more base station controller(s) (BSC) forming a base station system (BSS). The BSC's are, in turn, linked to a mobile switching center (MSC) which provides a connection between the BSS and a public switched telephone network (PSTN), as well as interconnection to other BSS's. Remote communication units (or mobile stations) (MS) inclusive of all types and styles of moveable/portable radio's, operating within the communication cells, transmit signals to (reverse link) and receive signals from (downlink) the serving BSS. A communication resource, therefore, is a pair of signals comprised of a downlink communication path and a reverse link communication path. The signals are processed by the BS, BSC and MSC to complete a communication transaction with another MS, or through the PSTN to a land-line telephone user.

Fundamental to such wireless communication systems is the ability to maintain established communication connections while moving in and between cell sites. This ability to "handoff" the call between cell sites is a requirement that dates back to the earliest analog wireless communication systems. As technology has improved, the cell sites themselves were split into sectors wherein each sector is serviced by a narrow-beam antenna. In this way, a 360° cell may be split into three 120° sectors, or six 60° sectors. In frequency division multiple access (FDMA) or time-division multiple access (TDMA) wireless communications systems, it is common to assign a set of separate frequencies to each of the sectors, thereby improving the channel reuse pattern of these frequencies among the cellular system from a 12-cell to a 7-cell or a 3-cell channel reuse pattern. As these frequencies represent the spectrum within which an operator is required to operate, its ability to reuse specific channels has a direct affect on its overall system capacity (i.e. the number of MS's the system may handle at a given time) and hence, its profitability. Therefore, it is well-known in the industry to work towards providing a 1-cell reuse pattern as being the optimal wireless communication system from a capacity standpoint.

Increasing capacity through channel reuse comes at a cost, however. A consequence of re-using the same channel in two or more cell's spaced too close together is heightened interference. This interference has a negative impact on the perceived call quality by the end-user, which has a corresponding negative impact on an operator's business. In addition to the interference problems, as the physical area of channel coverage is decreased (from a cell to a sector) the system is required to process increasingly more handoff requests, albeit the majority of these handoffs are intra-BS (from sector to sector within a cell). In FDMA and TDMA systems, wherein the sectors operate on separate frequency channels, the handoff is referred to as a hard-handoff. A hard-handoff is the "term of art" used to signify that the system is actually requiring the MS to change channels to maintain the communication connection. Actually, the communication connection, as it exists on a particular frequency, will be torn-down and reestablished on a separate frequency associated with the channel set of the new BS. This process of tearing-down and reestablishing the communication connection is often perceptible by the end-user and is, at best, an annoyance.

In one type of wireless communication system, the code division, multiple access (CDMA) communication system, a BS communicates with a plurality of MS's via a common wideband communication channel (e.g. 1.25 MHz in IS-95) that uses digital codes to identify the individual MS's within the communication channel. In this way, an operator utilizing CDMA coverage may be able to achieve the optimal 1-cell channel reuse pattern, while maintaining an acceptable level of interference. In addition, because of its inherent ability to use a common channel among a number of sectors within a cell site, the CDMA communication system has introduced the concept of soft-handoff. For ease of explanation, the concept of soft-handoff will be described with reference to the communication system depicted in FIG. 1.

Depicted in FIG. 1 is a CDMA wireless communication system capable of performing soft-handoff. FIG. 1 consists of two adjacent BS's, $BS_A$ 102 and $BS_B$ 106, along with their respective coverage areas 170 and 180. The line 190 represents the direction of travel of MS 104, while the points marked 110, 112, 113 and 114 along line 190 depict decision points for the wireless communication system.

With continued reference to FIG. 1, an ideal soft-handoff scenario begins with a CDMA MS 104 at point 110, where it is being serviced by $BS_A$ 102, driving in a direction marked by line 190. As MS 104 moves towards point 112, the pilot-signal signal strength of $BS_B$ 106 increases until where, at point 112, MS 104 identifies the pilot-signal (not shown) from $BS_B$ 106 as a viable communication resource and requests the wireless communication system 100 to establish $BS_B$ 106 as a diversity communication resource, thereby establishing the radio frequency (RF) communication link 132. At this point, or soon after MS 104 has identified the pilot-signal of $BS_B$ 106, $BS_B$ 106 will attempt to acquire MS 104 on reverse link 134. Reverse link acquisition is said to occur when $BS_B$ 106 can discriminate the unique code used by MS 104 from a plurality of other MS's (not shown) using different codes. Once the reverse link communication link 134 and the forward link communication link 132 have been established, a complete communication resource 130 is said to exist. In an ideal situation, these two events occur near simultaneously at point 112. Thus, where MS 104 is in simultaneous communication with two or more BS's (102,106), MS 104 is said to be in soft-handoff. Therefore, shaded area 150 represents the overlap in coverage of $BS_A$ 102 and $BS_B$ 106 and is referred to as the soft-handoff region 150 between the two BS's.

In FIG. 1, MS 104 continues to travel along path 190 in soft-handoff until it reaches the position marked by point 113. At point 113, MS 104 is nearing the outer bounds of Coverage Area A 170 of $BS_A$ 102. As such, the signal strength of the communication resource 120 is waning and MS 104 determines that $BS_A$ 102 is no longer a useful downlink diversity contributor. As a result, MS 104 requests the communication system 100 to drop the communication resource 120 between BS$_A$ 102 and MS 104. The system signals BS$_A$ 102, in a known fashion, to drop the forward link 122 with MS 104. The result is, at the position marked by point 114, MS 104 has left the soft-handoff region 150 between Coverage Area A 170 and Coverage Area B 180, and MS 104 is no longer in communication with BS$_A$ 102.

As with any ideal scenario, when implemented in real-world conditions there exists obstacles which need to be overcome. Such is the case with implementations of wireless communication systems. One such obstacle which has arisen in the context of CDMA soft-handoff is that of the "orphan condition". Referring again to FIG. 1, the orphan condition arises at the position marked 113 and is characterized as a situation in which the dominating downlink and reverse link are not associated with the same BS. Recall from the discussion above, at position 113, MS 104 has determined that BS$_A$ 102 is no longer a useful downlink diversity contributor and signals the communication system to sever the communication resource 120. In the ideal situation described supra, the communication resource 120 between BS$_A$ 102 will be dropped and MS 104 will be in communication with BS$_B$ 106 via communication resource 130. However, a problem arises when, at position 113, BS$_B$ 106 has yet to acquire MS 104 on its reverse link 134. That is, MS 104 can identify the downlink signal 132 from BS$_B$ 106, yet BS$_B$ 106 cannot identify reverse link signal 134 from MS 104. In such an instance, to sever communication resource 120 between BS$_A$ is tantamount to dropping the call. Thus defines the orphan condition inherent in prior art implementations of CDMA wireless communication systems.

Thus, a need exists to ensure that the original RF link to the first BS is not severed until such time as the communication system may confirm that both the forward and reverse link has been established between the MS and the second BS, thereby mitigating the opportunity for an orphan condition to arise.

DETAILED DESCRIPTION OF THE PREFERRED EMBODIMENT

Figure 1:
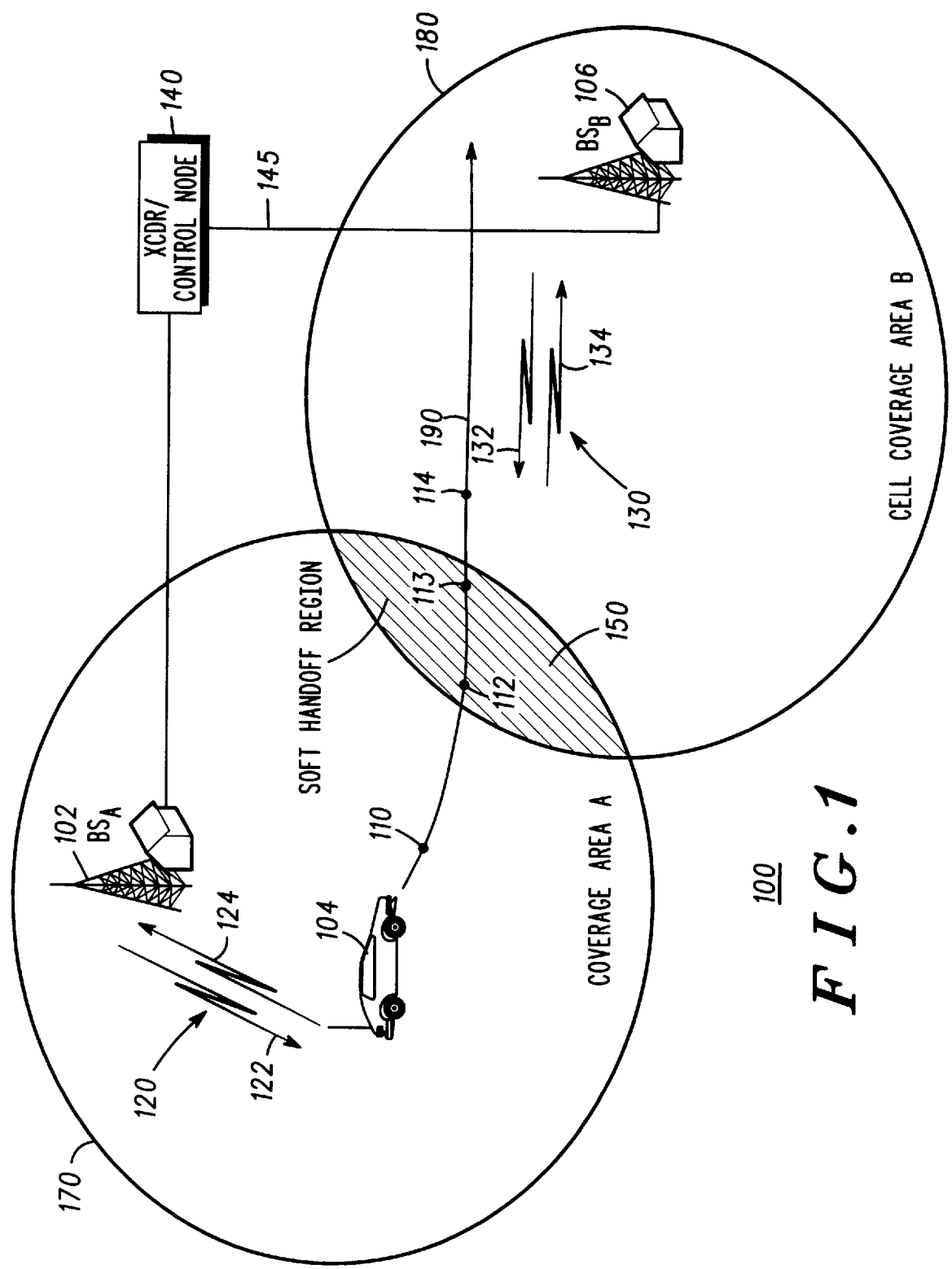
FIG. 1 depicts a wireless communication system capable of performing soft-handoff.

Generally stated, a method for performing soft-handoff within a wireless communication system 100 is described herein. The wireless communication system includes, inter alia, a mobile station 104, a first base station 102 for communicating with the mobile station 104 via a first communication resource 120, and a second base station 106 for communicating with the mobile station 104 on a second communication resource 130. In the preferred embodiment, a determination is made that the first communication resource 120 is no longer necessary. The wireless communication system 100 verifies that the second base station 106 has acquired the mobile station 104 via the second communication resource 130. If the second base station 106 has yet to acquire the mobile station 104 on the second communication resource 130, the wireless communication system 100 will override normal power control, increasing the mobile stations 104 transmit power, thereby mitigating the opportunity for an orphan condition to develop.

In particular, disclosed herein is a method of performing soft-handoff in a wireless communication system 100, the wireless communication system 100 including a mobile station 104 in communication with a first base station 102, the method comprising the steps of: determining that the first communication resource 120 between the mobile station 104 and the first base station 102 has degraded to a level where handoff is necessary; verifying whether a second communication resource 130 exists between the mobile station 104 and a second base station 106; sending a priority power control message when the second communication resource 130 does not exist between the mobile station 104 and the second base station 106 based upon the result of the verification; and terminating the first communication resource 120 when the second communication resource 130 is verified to exist.

Figure 2:
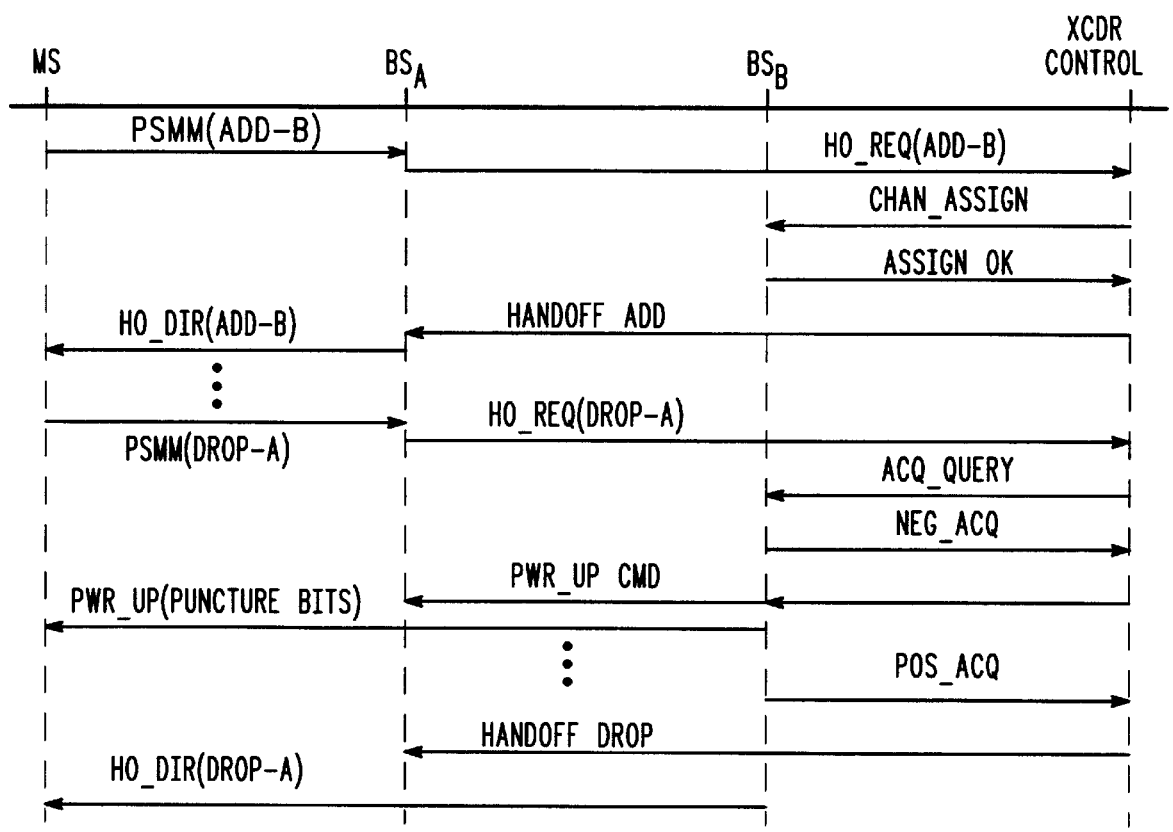
FIG. 2 depicts a ladder diagram representing an exemplary embodiment signaling scheme for a soft-handoff performed in accordance with the invention.

Turning to FIG. 2, a ladder diagram representing an exemplary embodiment signaling scheme for a soft-handoff performed in accordance with the invention is depicted. The ladder diagram is presented in a manner wherein moving left-to-right across the diagram represents signaling between participating entities, while moving down the diagram represents progression in time.

With continued reference to FIG. 1 and FIG. 2, participating entities, typical of a wireless communication system 100, are referenced along the top axis of FIG. 2. The MS 104, followed by a first BS 102 and a second BS 106, followed by a network element, in this case, and by example only, the Transcoder (XCDR)/Control node 140. The XCDR/Control node 140 is intended to represent the point in a communication network where handoff decisions are determined. In one communication system such decisions may be made locally, by the BS, or at a higher level BSC, or at the XCDR or MSC. Regardless of the particular system, the XCDR/Control node 140 represented in FIG. 2 is intended to cover any and all such decision points.

As shown in FIG. 2, the process begins when the MS 104 identifies the presence of a second BS, BS$_B$ 106. The MS 104 may detect the presence of BS$_B$ 106 by receiving its pilot signal, or by receiving notice from the communication system 100 that it is entering the coverage area 180 for BS$_B$ 106 or by any number of alternative means. Regardless of the detection means, once the MS 104 identifies the presence of a second BS 106, it is advantageous to use it as a diversity signal source, so it may attempt to establish the BS$_B$ 106 as a soft-handoff candidate. To do so, the MS 104 sends a pilot strength measurement message, or "PSMM", to the system via BS$_A$ 102 to add BS$_B$ 106. BS$_A$ 102 relays this request to the XCDR/Control node 140 which, in turn, signals BS$_B$ 106 to assign a channel to accommodate this incoming MS 104. If BS$_B$ 106 can accommodate another MS 104, it signals the XCDR/Control node 140 that it has made the channel assignment via the "ASSIGN OK" message. Once the channel assignment is made, the XCDR/Control node 140 signals BS$_A$ 102 to direct the MS 104 to add BS$_B$ 106 via the "Handoff Add" message. Once received, BS$_A$ 102 signals the MS 104 to add BS$_B$ 106 as a diversity signal source via the "HO_DIR (ADD-B)" message.

If the MS 104 is moving away from the first base station, BS$_A$ 102, there will come a point where the MS 104 determines that BS$_A$ 102 is no longer an effective downlink diversity contributor. This decision may be a complex one, involving a number of factors such as signal quality, signal strength, or any number of network variables. Once the MS 104 has determined that $BS_A$ 102 is no longer an effective downlink diversity contributor, it will signal the communication system to release $BS_A$ 102 in favor of the remaining BS('s), in this example $BS_B$ 106. The process of releasing $BS_A$ 102 begins with MS 104 signaling all BS's assigned to the MS 104 and receiving its signal on the reverse link that it wants to drop $BS_A$ 102 via the "PSMM (Drop-A)" message. In the ideal case, depicted in FIG. 2, where $BS_B$ 106 has acquired the MS 104 and is receiving its reverse link signal 134, both $BS_A$ 102 and $BS_B$ 106 signal the XCDR/Control node 140 that MS 104 wants to drop $BS_A$ 102 via the "HO_REQ (Drop A)" message. However, FIG. 2 depicts the real-world situation where $BS_B$ 106 may not have acquired MS 104 on the reverse link 134. Therefore, consistent with the preferred embodiment, prior to dropping the first communication resource 120, the XCDR/Control node 140 will first query $BS_B$ 106 as to whether it has acquired MS 104 on the reverse link 134 via the "ACQ_QUERY" message. If $BS_B$ 106 has not yet acquired MS 104, it will respond with the negative acquisition response "NEG_ACQ". Upon receiving a "NEG_ACQ", the XCDR/Control node 140 signals all serving BS('s), in this example $BS_A$ 102 and $BS_B$ 106, to have the MS 104 increase its output power to improve $BS_B$ 106 ability to acquire the MS 104 on the reverse link 134. This is accomplished by sending the "PWR_UP" command to all serving BS's, which in turn commands the MS 104 to increase it's transmit power, thereby improving the probability that acquisition will occur at the second BS 106.

In general, there are two levels of power control within the wireless communication system. In the first level, commonly referred to as the "outer loop" power control, the communication system monitors the "quality" of the communication channel's performance. The communication system may use any number of quality measures, such as frame erasure rate, symbol erasure rate, bit error rate, or C/I, as but a few examples. As the measured quality of the communication channel degrades below an acceptable threshold, the communication system will command the MS 104 to increase its transmit power to compensate. The outer loop power control is generally a slow-moving, gradual power adjustment scheme.

The second level of MS 104 power control is referred to as the "inner loop" power control. The inner loop power control accounts for fading of the communication channel incurred due to the MS 104 movement within the communication system 100. The inner loop power control needs to provide quick response in order to account for "fast-moving" MS 104, such as a car motoring down an expressway at 65 miles-per-hour. The "PWR_UP" command, as referenced in the paragraph above, is a priority power control message, and thus overrides both inner and outer loop power control mechanisms. This provides for an immediate response in power level, making every effort to provide $BS_B$ 106 with a reverse link signal 134 from the MS 104.

The "ACQ-QUERY"-"PWR_UP" process will repeat until the XCDR/Control node 140 receives a positive acquisition confirmation "POS_ACQ" in response to its "ACQ_QUERY" message.

Once the XCDR/Control node 140 receives a "POS_ACQ" from $BS_B$, the reverse link 134 of the second communication resource 130 is verified, and the XCDR/control node 140 can safely drop the first communication resource 120 without affecting the service of the MS 104. As such, the XCDR/Control node 140 issues a "Handoff Drop" message to all serving BS's, in this example $BS_A$ 102 and $BS_B$ 106 These BS, in turn, issue a command to the MS 104 to drop $BS_A$ 102 via the "HO_DIR (Drop A)" command.

By interrogating the $BS_B$ 106 prior to releasing the $BS_A$ 102 from service, and by issuing the priority power control messages, the improved soft-handoff method mitigates the opportunity for an orphan condition to develop.

Figure 3:
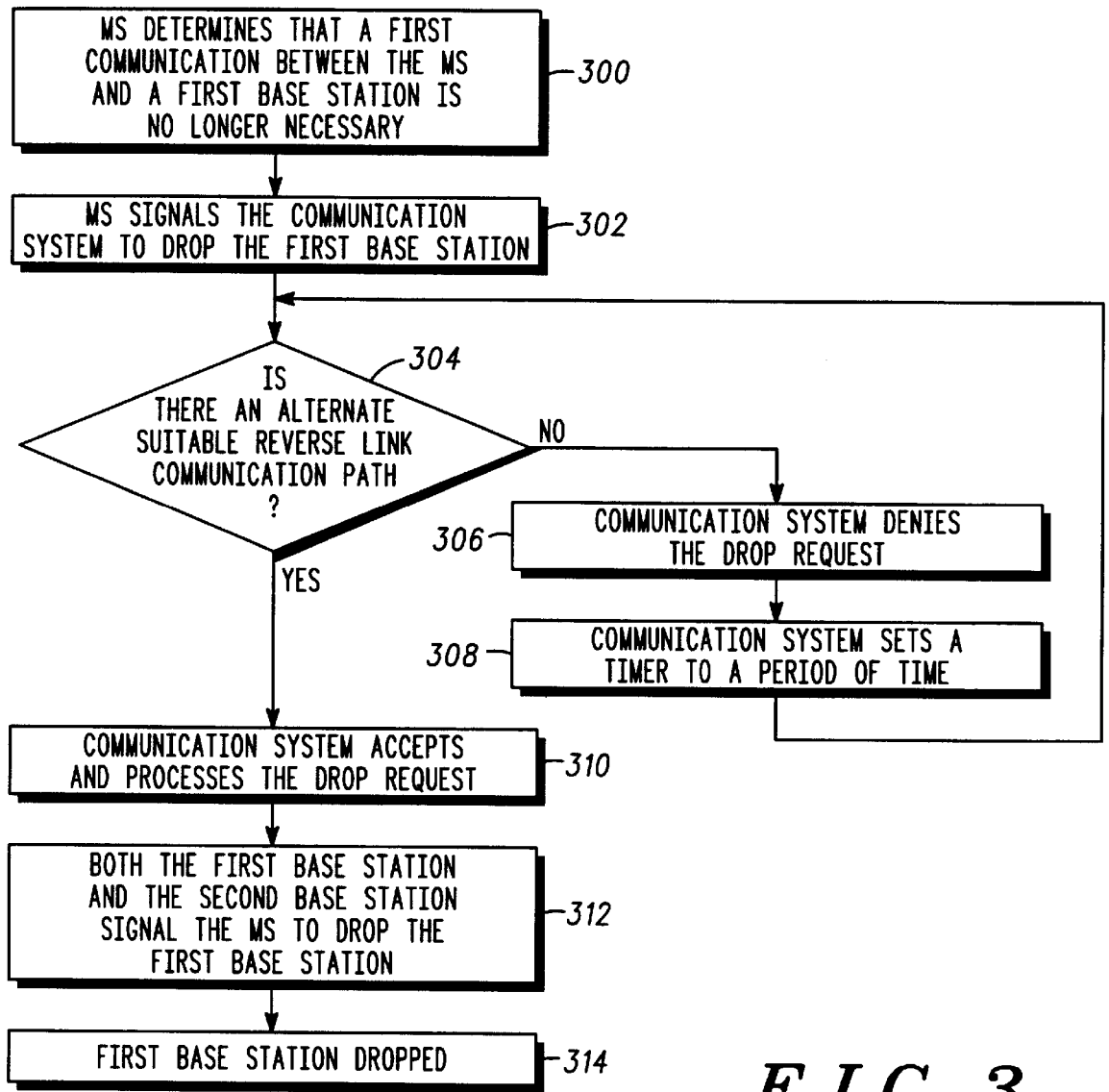
FIG. 3 depicts a flow chart representing an alternate embodiment soft-handoff performed in accordance with the invention.

Turning now to FIG. 3, a flow chart representing an alternate embodiment soft-handoff performed in accordance with the invention is depicted. Beginning with step 300, the MS 104 determines that the first BS 102 is no longer an effective downlink diversity contributor or, stated differently, determines that the communication resource between MS 104 and $BS_A$ 102 has degraded to a level where handoff is necessary. As a result, the MS 104 signals the communication system 100 to release the first BS 102 in favor of a second BS 106 in step 302. In step 304, the communication system 100 determines whether the second BS 106 has acquired the MS 104 on its reverse link 134. If the second BS 106 has acquired the MS 104 on its reverse link 134, the communication system 100 informs the first BS 102 and the second BS 106 to signal the MS 104 to drop the first BS 102 in step 310. As a result, in step 312, both the first BS 102 and the second BS 106 signal the MS 104 to drop the first BS 102. In step 314, the first BS 102 is dropped and the MS 104 is in primary communication with the second BS 106.

With continued reference to FIG. 3, turning back to step 304 wherein the communication system 100 determines that the second BS 106 has not yet acquired the MS 104 on the reverse link 134, the communication system 100 will, in step 306, deny MS's 104 request to drop the first BS 102. In step 308, the communication system 100 will set a timer and wait a period of time. The process returns to step 304, where the communication system 100 again evaluates the suitability of dropping the first BS 102. The period of time of step 308 may be preset, or may be variable depending upon the capacity requirements of the communication system 100.

With the approach described with reference to FIG. 3, the likelihood of an orphan condition arising is mitigated by, first, querying the second BS 106 as to whether it has acquired the MS 104; and, second, by waiting a for a period of time, thereby allowing the MS 104 to move from its current position to a new position that may improve the probability that the second BS 106 will acquire the MS 104.

Figure 4:
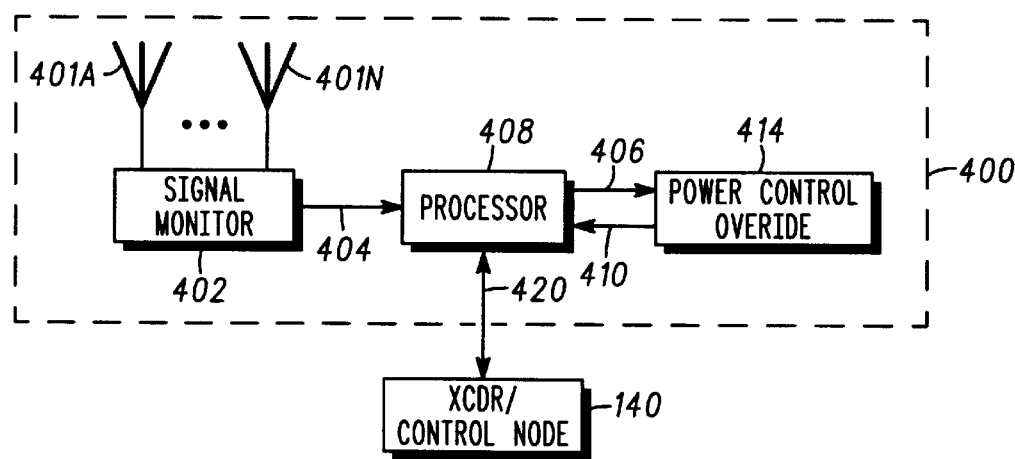
FIG. 4 depicts an apparatus capable of performing soft-handoff representative of an alternate preferred embodiment in accordance with the invention.

Turning to FIG. 4, a block diagram of an apparatus 400 for controlling soft-handoff in a wireless communication system 100 is depicted. As shown, the apparatus is comprised of a signal monitoring device 402, a processor 408 coupled to said signal monitoring device 402 as well as the XCDR/control node 140 for the wireless communication system 100, and a power control override device 414 which is also operatively coupled to said processor 408.

In operation, the signal monitoring device 402 constantly monitors the quality of the downlink signal of the plurality of communication resources in existence between a particular MS 104 and a plurality of BS's. The quality of the downlink signal is determined by monitoring a signal metric which, by way of example, may include carrier to interference levels (C/I), bit error rate, symbol error rate, frame erasure rate, or received signal strength (RSSI).

When the quality of a particular downlink signal drops below a threshold point, the signal monitor device 402 informs the processor 408 that the corresponding communication resource, hereafter referred to as the first communication resource 120, is no longer an effective downlink diversity contributor. The processor 408, which is in communication with the wireless communication system 100, queries the wireless communication system 100 to determine if an alternate base station candidate, hereafter referred to as the second base station 106, has acquired the mobile station 104 on the reverse link of its communication resource, hereafter referred to as the second communication resource 130. If the processor is able to confirm that the second communication resource 130 has been established, the processor 408 will inform the wireless communication system 100 to terminate the first communication resource 120.

With continued reference to FIG. 4, if the processor 408 is unable to verify that a second communication resource 130 has been established, the processor 408 will instruct the power control override device 414 that an immediate increase in the MS 104 transmit power is required. The power control override device 414 will send a priority power control message, via the processor 408, to all BS's in communication with the MS 104 to have MS 104 immediately increase its transmit power. After the wireless communication system 100 has sent the priority power control message, the processor 408 will again verify that the second base station 106 has acquired the MS 104. The apparatus 400 will repeat the verification-power control override process until the processor 408 can verify that a second communication resource 130 has been established between the MS 104 and the second base station 106. In so doing, the apparatus 400 mitigates the opportunity for an orphan condition to arise.

While the invention has been particularly shown and described with reference to a number of embodiments, it will be understood by those skilled in the art that various changes in form and details may be made therein without departing from the spirit and scope of the invention.

What we claim is:

1. A method of performing soft-handoff in a wireless communication system, the wireless communication system including a mobile station in communication with a first base station, the method comprising the steps of:

determining that the first communication between the mobile station and the first base station has degraded to a level where handoff is necessary;

verifying whether a second communication exists between the mobile station and a second base station;

sending a priority power control message to the mobile station when the second communication does not exist between the mobile station and the second base station based upon the result of the verification; and terminating the first communication when the second communication is verified to exist.

2. The method of claim 1, wherein the determining function comprises the steps of:

monitoring a signal metric of the first communication; and determining that the first communication is no longer an effective downlink diversity contributor when the signal metric drops below a threshold level.

3. The method of claim 1, wherein a communication occurs via a communication resource having a downlink communication path and a reverse link communication path.

4. The method of claim 1, wherein the priority power control message overrides inner and outer loop power control functions thereby instructing the mobile station to immediately increase its transmit power.

5. The method of claim 1, wherein the steps of verifying and sending are repeated until the second communication exists between the mobile station and the second base station.

6. The method of claim 1, wherein the verifying function comprises interrogating the second base station as to whether it has acquired the mobile station on a reverse link of a communciation resource.

7. A method for performing soft-handoff in a wireless communication system, the wireless communication system including a mobile station responsive to a plurality of base stations via downlink and reverse link communication paths, the method comprising the steps of:

determining that one of a plurality of downlink communication paths is no longer necessary;

verifying that an alternate suitable reverse link communication path exists;

sending a priority power control message to a mobile station, thereby overriding an inner loop power control and an outer loop power control mechanism, when the alternate suitable reverse link communication path does not exist; and releasing the one downlink communication path that is no longer necessary when the alternate suitable reverse link communication path exists.

8. The method of claim 7, wherein the determination that a downlink communication path is no longer necessary is made when the downlink communication path is no longer an effective downlink diversity contributor.

9. The method of claim 7, wherein the verifying function is performed by the communication system.

10. The method of claim 7, wherein the verifying function is performed by the mobile station.

11. The method of claim 7, wherein the steps of verifying and sending are repeated until the alternate suitable reverse link communication path exists.

12. An apparatus for performing soft-handoff in a wireless communication system, the wireless communication system including a mobile station in communication with a first base station, the apparatus comprising:

a signal monitor which determines that a first communication between the mobile station and the first base station has degraded to a level where handoff is necessary;

a processor which verifies that a second communication exists between the mobile station and a second base station; and a power control override device which sends a priority power control message to the mobile station thereby overriding inner loop and outer loop power control.

13. The apparatus of claim 12, wherein the power control override sends a priority power control message only when the processor is unable to verify that the second base station has yet to acquire the mobile station on the reverse link of the second communication resource.

14. The apparatus of claim 12, wherein the signal monitor determines that a first communication resource is no longer required when a signal metric falls below a threshold level.

15. The apparatus of claim 14, wherein the signal metric may be any of a plurality of signal quality measures including, but not limited to, for example symbol error rate, received signal strength, frame erasure rate, bit error rate and C/I levels.

16. The apparatus of claim 14, wherein the threshold level may be variably set by the wireless communication system in response to the current capacity requirement placed on the wireless communication system.

* * * * *